Patented June 6, 1950

2,510,661

UNITED STATES PATENT OFFICE 2,510,661

LOADING PAPER FIBERS WITH ORGANO-POLYSILOXANE COATED CLAY

Moyer M. Safford, Schenectady, N. Y., assignor to General Electric Company, a corporation of New York No Drawing. Application May 6, 1944, Serial No. 534,538

3 Claims. (Cl. 92—21)

The present invention relates to finely-divided inorganic materials and to the treatment thereof to improve their water and humidity resistance, and their compatibility with organic materials. It is particularly concerned with improved pigments and fillers for paper and with paper comprising such materials.

Inorganic materials in varying degrees of fineness are used for divers purposes in industry. Clays, calcium sulphate, calcium carbonate, barium sulfate, titanium dioxide, zinc sulfide, zinc oxide, etc. are employed as paper fillers. Many of these same materials and others such as lead oxide, lead carbonates, cadmium chromates, iron oxides, etc. are employed as pigments or fillers for paints, molded products, etc. Some of these inorganic materials are also used in the manufacture of products such as face powder, masking creams, etc., where their covering power in the presence or absence of a carrying medium is of importance. In all of these applications it is highly desirable that the finely-divided materials be free flowing, and in general possess good water- and humidity-resistance, and good compatibility with the organic compounds employed as carriers or binders for inorganic materials.

The present invention is based on my discovery that improved fillers and pigments possessing the above-mentioned properties can be obtained by treating the finely divided inorganic materials with vapors of an organo-silicon halide or mixture of organo-silicon halides. Examples of organo-silicon halides suitable for the purposes of the present invention are given in Patnode Patent 2,306,222 and include alkyl (methyl), aryl (phenyl), alkaryl (tolyl), and aralkyl (phenyl methyl) silicon halides. I prefer to employ compositions comprising a methyl silicon halide or a mixture of methyl silicon halides, particularly compositions containing azeotropic mixtures of trimethylchlorosilane and silicon tetrachloride such as those described in the copending application of Francis J. Norton, Serial No. 476,767, filed February 22, 1943, now U. S. Patent 2,412,470, issued December 10, 1946.

The preferred process of treating the inorganic materials consists essentially in agitating the finely-divided material in a closed container in the presence of vapors of the treating material. The amount of treating material and the length of treatment will depend upon the surface area of the inorganic material and the nature of the organo-silicon halide employed. With methyl silicon chlorides (or mixtures thereof with or without silicon tetrachloride) preferably containing an average of more than one and less than about three halogen atoms attached to silicon atoms, I prefer to use from one to ten per cent by weight of treating agent based on the weight of the inorganic material.

In the case of many of the materials, there is noticeable alteration in the physical properties as a result of the treatment with the organo-silicon halides. Clays and similar materials lose completely the aggregating properties characterizing the untreated materials and flow like hot Portland cement. The treated materials also have a much greater covering power. This can be demonstrated by rubbing treated and untreated clay on the skin. Thus, by treating the magnesium silicates and other ingredients of face powders in accordance with the present invention, products can be obtained which are lighter or more fluffy and which have improved covering qualities. Various powdered materials treated with organo-silicon halides as described herein, due to their water-resistance, lightness and dispersibility may be used, in place of flares for marking positions on water.

Papers containing fillers or loading materials treated in accordance with my invention have been found to be more water-resistant than similar papers made from untreated fillers. This aspect of the invention will be illustrated with specific reference to clay-filled paper.

A batch of Catalpo clay was treated with a mixture of methylchlorosilanes consisting essentially of the trimethylchlorosilane-silicon tetrachloride azeotrope. The treated product was heated to drive off any hydrogen chloride and was then made into a paste with ethyl alcohol. The alcohol or an equivalent water-miscible liquid such as acetone serves to wet the treated clay and facilitate its dispersion in the aqueous-paper pulp or fiber mixture. Equal parts of the clay paste and paper-making fibers, specifically wood pulp, were mixed or beaten together in a large volume of water, agitated and drawn onto a screen under vacuum in accordance with the usual practice of making paper. The product possessed water-repellent properties. The alcohol or ketone used to disperse the treated clay in water has no apparent effect on the water-repellent properties of the treated clay. If the alcohol- or ketone-dispersed clay is filtered from the water and dried, it will be found to possess its original water-resistance and will again float on the surface of a body of water.

What I claim as new and desire to secure by Letters Patent of the United States, is:

1. In the process of making a water-repellent paper from paper stock, the improvement for increasing the dispersibility of a normally non-dispersible finely divided paper filler which comprises adding to the water slurry of the paper stock prior to beating the slurry and forming a paper, a paste consisting essentially of (a) a finely divided inorganic paper filler the particles of which are coated with a thin water-repellent film of an organopolysiloxane obtained by subjecting the aforesaid particles to the vapors of an organohalogenosilane selected from the class consisting of methylchlorosilanes and azeotropic mixtures of trimethylchlorosilane and silicon tetrachloride, and (b) a water-miscible organic liquid.

2. In the process of making a water-repellent paper from paper stock, the improvement for increasing the dispersibility of a normally non-dispersible finely divided paper filler which comprises adding to the slurry of the paper stock prior to the beating of the slurry and forming the paper, a paste consisting essentially of (a) a finely divided inorganic clay filler the particles of which are coated with a thin water-repellent film of an organopolysiloxane obtained by subjecting the aforesaid clay particles to the vapors of an azeotropic mixture of trimethylchlorosilane and silicon tetrachloride, and (b) ethyl alcohol.

3. The process as in claim 2 wherein the finely divided water-repellent clay and paper stock are employed in equal parts, by weight.

MOYER M. SAFFORD.

REFERENCES CITED

The following references are of record in the file of this patent:

UNITED STATES PATENTS

| Number | Name | Date |
|---|---|---|
| 1,424,306 | Hoskins | Aug. 1, 1922 |
| 1,989,824 | Rennie | Feb. 5, 1935 |
| 2,059,464 | Kress et al. | Nov. 3, 1936 |
| 2,109,944 | Larson | Mar. 1, 1938 |
| 2,118,898 | Price | May 31, 1938 |
| 2,258,218 | Rochow | Oct. 7, 1941 |
| 2,296,637 | Hanahan | Sept. 22, 1942 |
| 2,306,222 | Patnode | Dec. 22, 1942 |
| 2,347,496 | Muskat | Apr. 25, 1944 |
| 2,394,040 | Callinan | Feb. 5, 1946 |
| 2,412,470 | Norton | Dec. 10, 1946 |

OTHER REFERENCES

Bancroft: Applied Colloid Chemistry, 2d ed., page 350 (1926), published by McGraw-Hill, New York.